3,267,083
REPROCESSABLE CROSSLINKED POLYMERIC COMPOSITIONS

Lawrence G. Imhof, Westfield, N.J., assignor to Union Carbide Corporation, a corporation of New York
No Drawing. Filed June 7, 1963, Ser. No. 286,181
8 Claims. (Cl. 260—80.5)

The invention relates to novel polymeric compositions. More particularly, the invention relates to novel reprocessable crosslinked polymeric compositions.

Polyolefins and olefin interpolymers, particularly the well-known ethylene polymers, are available in a wide range of stiffness for use in divers applications such as household goods, pipe, film, wire and cable, and the like. They are characterized by thermoplasticity, the fact that they melt above their crystallization temperature, and their solubility in many organic solvents. They do, however, exhibit a variety of inferior physical properties which eliminate them from consideration for many uses for which they would otherwise be well-suited. For example, they are known to stress crack badly when exposed to various liquid environments, particularly detergents. One means used in the past to improve the physical properties of these polymers has been covalent crosslinking, and, as a result, crosslinked polymers, particularly crosslinked ethylene polymers, are well-known in the art. Crosslinking of polyolefins has been effected by use of organic peroxides and other free radical-source compounds (U.S. 2,826,570, U.S. 2,888,424) and by use of various methods of irradiation such as ultraviolet irradiation (J. Polymeric Sci. 22, 185 (1956); ibid., 34, 671 (1959)) and electron radiation (U.S. 2,855,517, U.S. 2,887,500 and U.S. 2,906,678–9). The crosslinked ethylene polymers thus produced exhibit improved solvent resistance and clarity, stress crack resistance, high molecular weight, and high viscosity. In addition, tensile properties and impact strength, over a wide range of temperatures, are often improved.

These crosslinked polymer systems have a number of significant disadvantages. For example, an additional step for curing or vulcanizing is required. Most disadvantageous, however, is the fact that conventional crosslinked systems, such as unsaturated rubbers cured with sulfur, polyolefins cured with peroxides, and carboxyl- or hydroxyl-containing polymers cured with poly- or difunctional covalent reagents, such as diepoxides, diisocyanates or diamines, are irreversibly, or covalently, crosslinked and cannot be reprocessed or reworked after crosslinking has been effected.

In accordance with this invention, it has now been discovered that polyolefin-based polymers containing in their backbones pendant acid groups, i.e., carboxyl or anhydride, can be reversibly, or ionically, crosslinked with certain metal oxides and polyvalent metal salts, hereinafter described in full, to provide reprocessable crosslinked polyolefin systems.

By the term "polyolefin-based polymers containing in their backbones pendant acid groups" as used herein is meant an interpolymer or graft polymer of at least one monoolefin preferably containing from 2 to 10 carbon atoms inclusive, with at least one acid group-containing, i.e., carboxyl- or anhydride group-containing, monoolefinically unsaturated monomer.

The polyolefin-based polymers containing pendant acid groups contemplated for use in this invention are high polymers, i.e., normally solid, high molecular weight polymers, and are to be distinguished from those polymers normally considered to the waxes or greases. The melt index of useful polyolefin-based polymers can range from a melt index of 0 to about 1000, and preferably from about 0.02 to 100.

Illustrative of polyolefin-based polymers containing pendant carboxyl or anhydride groups which can be reversibly crosslinked to provide the reprocessable polymeric compositions of this invention are ethylene/acrylic acid copolymers, ethylene/methacrylic acid copolymers, ethylene/ethyl acrylate/acrylic acid terpolymers, ethylene/vinyl acetate/acrylate acid terpolymers, and polyethylene/maleic anhydride graft polymers prepared by modification of polyethylene with maleic anhydride under conditions of chain scission as are produced by combining the molten reactants, and the like. This list however, is intended to be merely illustrative and should not be considered restrictive of the polyolefin-based polymers containing pendant acid groups which can be used. It is to be emphasized that any polymer containing a hydrocarbon backbone possessing pendant carboxyl or anhydride groups can be successfully employed herein. The preferred polyolefin-based polymers containing pendant acid groups are ethylene/acrylic acid and ethylene/vinyl acetate copolymers and ethylene/ethyl acrylate/acrylic acid terpolymers.

The concentration of aicd groups in the polyolefin-based polymers can be from 0.1 percent by weight, calculated as free carboxyl group, to 15 percent by weight. The preferred range is from 0.5 to 10 percent by weight carboxyl.

Crosslinking agents which, when crosslinked with the above-described polyolefin-based polymers containing pendant acid groups provide reprocessable crosslinked polymeric compositions, are polyvalent metal alkanoates containing from 3 to about 12 carbon atoms in the alkane chain, e.g., hexanoates and octanoates, and the like, and polyvalent metal salicylates, naphthenates, oxides, hydroxides, and acetyl acetonates. The polyvalent metal alkanoates, salicylates, naphthenates and acetyl acetonate which can be used are salts of those metals from Groups IIA and IIB, Group IIIA, preferably aluminum, IVA and IVB, preferably tin and zirconium, VIB, preferably chromium, and VIII, preferably iron and nickel, of the Deming Periodic Table (Handbook of Chemistry and Physics, 30th edition, p. 312). Polyvalent metal oxides and hydroxides useful herein are those metal oxides and hydroxides of Group II, preferably zinc and magnesium, of the Deming Periodic Chart.

From about 0.05 to 120, and preferably from about 0.2 to 15, parts of the crosslinking agent can be used per 100 parts polyolefin-based polymer containing pendant acid groups, by weight.

The reversibly crosslinked polymeric compositions of this invention cover a spectrum of stiffness down to and including the elastomeric range, i.e., from about 100 to about 150,000 p.s.i. as determined by ASTM D–638–58T.

The crosslinking agent can be mixed with the polymer by any method which provides an efficient combination, such as mixing in a Banbury mixer, mixing solutions of the polymer and crosslinking agent, dry blending where applicable, and similar mixing techniques. The curing time and temperature are similarly not particularly critical, and can vary over a wide range. In general, temperatures from about 75 to 250° C. are satisfactory, depending on the reactivity of the reagent used. Time for curing depends upon the temperature used, increasing as the temperature decreases.

In a typical mixing and curing operation, the fluxed sheet of polymer plus crosslinking agent was compression mold cured at a temperature of about 180° C. for 30 minutes. At this temperature for this period of time maximum reaction had almost always occurred. Frequently, however, the mixing step produced the maximum crosslinking for a specific system. In actual practice, the curing step is carried out either in the mixing step or the extrusion or molding operation.

It is to be emphasized that the polyolefin-based polymers of this invention are reversibly crosslinked. Reversible crosslinking cannot be effected with polyolefins and olenfin copolymers which do not contain pendant acid groups. Reversible crosslinking is to be clearly distinguished from the irreversible crosslinking obtained with free radical-generating crosslinking agents. The reversibly crosslinked polymers of this invention can be readily worked and formed on heating and behave as thermoplastics whereas irreversibly crosslinked polymers contain infusible and non-reworkable chemical bonds. Especially preferred in preparing reversibly crosslinked terpolymer formulations are the polyvalent metal oxides, zinc oxide and magnesium oxide, and octoates such as zirconium octoate, barium octoate, chromium octoate and nickel octoate, as well as zirconium salicylate, zirconium naphthenate, zirconium acetyl acetonate, aluminum acetyl acetonate, and zinc acetyl acetonate. The great advantage of the use of reversible crosslinking agents is that they impart to the crosslinked polymer the ability to be reprocessed at the high temperature and pressure used in most fabricating techniques for thermoplastics. Because these crosslinked polymer systems can be reprocessed they are useful in techniques such as injection and blow molding, and monofilament extrusion, where crosslinked systems have heretofore not been applicable. Other advantages are that scrap can be reworked, thus providing considerable product economies, and that simplification can be made in techniques that generally have required a curing step following the forming step (such as compression molding, and extrusion of wire or cable followed by passage through a continuous steam vulcanizer to effect cure).

Without absolute commitment to this theory, it is believed that the reprocessability of these reversibly crosslinked systems is due to the mobility of the ionic link in the presence of free carboxyl groups on the terpolymer chain when it is subjected to high stress (pressure) at a high temperature. The ionic crosslink breaks and the metal ion, still attached to one polymer chain, slips along until the stress is released. When the stress is released, the metal ion reacts with a nearby free carboxyl group, thereby reforming the crosslink and restoring the good physical properties and high temperature solvent resistance which are characteristic of crosslinked materials. These reversibly crosslinked systems also show similar tensile strengths at elevated temperatures and similar stiffness-temperature relationships as do irreversibly crosslinked copolymers.

The reprocessability of reversibly crosslinked polymers described herein has been shown by measurement of melt flow rates and by repressing compression molded plaques. The repressed plaques show almost the same properties as do the original plaques. Where there is a small decrease in some of the properties it is thought to be due to the fact that fewer ionic crosslinks reform in the repressed polymer as compared with the number present in the original crosslinked polymer. The steric effect of other pendant groups or a cage effect which may include metal ions could account for the reformation of fewer crosslinks.

Polyvalent metal oxides, such as zinc oxide and magnesium oxide, yield reprocessable systems when used as additives to the polyolefin-based polymers described herein. The mechanism leading to reprocessability is thought to be different from the ionic mechanism described earlier. These oxides do not appear to form ionic crosslinking bonds themselves; the reinforcement effected in their formulations may be due to hydrogen bonding with free carboxyl groups. Inasmuch as a reinforcement found with no other filler is achieved, however, such polyvalent metal oxides are best considered reactive fillers. These reactive fillers can be used in greater amounts than the crosslinking agents normally used for crosslinking, e.g. from about 120 to 150 per hundred parts polymer, by weight, if desired.

A great number of common fillers are accepted with ease by the reversibly crosslinked polymers of this invention; examples of such fillers include carbon blacks, clays, magnesium silicate and silica. The curing formulation can also contain stabilizers, antioxidants, processing aids, colorants, and other additives if desired.

In the reprocessable polymeric compositions of this invention cure proceeds rapidly during the forming step, and the customary post-forming vulcanization operation associated with peroxide-crosslinked polymer systems can be omitted. In addition, at the temperatures and pressures normally encountered in end-use, the products herein exhibit the highly advantageous physical and mechanical properties typical of irreversibly cross-linked materials but can readily be reprocessed and reshaped at higher temperatures and pressures, and without the serious physical property deterioration associated with reprocessed peroxide-crosslinked systems.

In general, the reversibly crosslinked polymers of this invention exhibit superior resistance to solvents, resistance to distortion at elevated temperatures, elevated temperature tensile strength, stress crack resistance, and other properties heretofore found only in polymers crosslinked irreversibly with peroxides and the like. The polymers described herein are, therefore, useful in applications found by irreversibly crosslinked polymers such as pipe, cable jacketing, line wire covering, power cable insulation, and the like.

To illustrate the invention more fully, the following descriptions and examples are given. All parts and percentages are by weight unless otherwise specified.

Physical properties were measured on samples using the following test methods:

| Test: | ASTM No. |
|---|---|
| Ultimate tensile and percent elongation | D-412-51T |
| Vicat softening point | D-1525-58T |
| Tensile impact strength [a]. | |
| Tensile set at 100% elongation | D-470 |
| Secant modulus of elasticity [b] | D-638-58T |
| Environmental stress crack resistance [c]. | |
| Melt index | D-1238-57T |

[a] An Izod testing machine is used to run this test. The test specimen, in the form of a ⅜″ x 2½″ x 0.040″ plaque is mounted in a horizontal position in a device consisting of two clamps. One clamp is stationary and the other is free permitting horizontal travel. After the sample is mounted, a calibrated pendulum is allow to strike the free clamp. The momentum of the pendulum drives the clamp along a horizontal path, thus elongating the sample. The force, in foot pounds per square inch, required to break the sample is then calculated.

[b] The test specimen is the "A" die size, as described in ASTM D-412.

[c] To determine stress crack resistance, a 125 mil compression molded specimen 0.5″ x 1.5″ was slit along the long dimension. The slit was 20 mils deep and 75 mils long. The specimen was then bent 180°. Ten such bent specimens were held in a channel which was then immersed in Hostapal, a non-ionic surfactant believed to be similar to nonyl phenoxy polyethylene ethanol, at 50° C., in a test tube. Two such channel devices were put into each tube, providing 20 specimens per test. Time to failure of any one specimen was the appearance of a crack perpendicular to the slit; "$F_{50}$" is the time to failure of 50 per cent (i.e., 10) of the specimens.

EXAMPLE 1

Example 1 describes various polyolefins containing in their backbones pendant acid groups and presents examples of processses well-known in the art, by which these polymers can be prepared. In Table I is compiled data serving to describe these polymers. Code letters A–R will be employed hereinafter in the examples to refer to a particular polymer.

EXAMPLE 2

Example 2 shows crosslinking of ethylene/acrylic acid copolymers with crosslinking agents leading to reprocessable crosslinked polymeric compositions. Data for Example 2 is compiled in Table II.

In this example, and in Examples 3 and 4 following, it is seen that polyvalent metal octoates, salicylates, naphthenates, oxides (and hydroxides), and acetyl acetonates

*Table I.—Polyolefin descriptions*

| Code Letter | Process for Preparation | Melt Index | Flow Index | Percent by Weight Co-monomer in Product | | Modulus |
|---|---|---|---|---|---|---|
| | ETHYLENE/ACRYLIC ACID COPOLYMER: GROUP I | | | | | |
| A | Copolymerization, tubular proc | 4.0 | 200 | 4.3 | | 45,000 |
| B | do | .25 | 31 | 13.5 | | 44,100 |
| C | do | 9.4 | 580 | 2.4 | | 55,900 |
| D | Copolymerization, stirred autoclave proc | 8.2 | 300 | 3.8 | | 41,000 |
| E | Copolymerization, tubular proc | .17 | 30 | 7.2 | | 45,000 |
| F | do | 79.2 | 1,000 | 4.6 | | 45,000 |
| | | | | Percent by Weight ethyl acrylate | Percent by Weight acrylic acid | |
| | ETHYLENE/ETHYL ACRYLATE/ACRYLIC ACID TERPOLYMER: GROUP II | | | | | |
| G | Partial hydrolysis of ethylene/ethyl acrylate copolymer (tubular process). | 1.6 | 98 | 11 | 4.0 | 5,700 |
| H | do | 25 | 425 | 20 | 4.2 | 800 |
| I | do | 3.5 | 156 | 3–5 | 2.1 | 12,400 |
| J | Almost complete hydrolysis of ethylene/ethyl acrylate copolymer (tubular process). | 2.5 | 137 | 1 | 1.3 | 15,400 |
| K | do | .7 | 45 | 1 | 7.8 | 12,700 |
| L | Partial hydrolysis of ethylene/ethyl acrylate copolymer (tubular process). | | 52 | 1–2 | 5.8 | 14,400 |
| M | Direct tubular polymerization | 13 | 200 | 17 | 6.9 | 2,700 |
| N | Almost complete hydrolysis of ethylene/ethyl acrylate copolymer (tubular process). | 2.2 | 82 | 1 | 3.5 | 11,000 |
| | | | | Percent by Weight vinyl acetate | | |
| | ETHYLENE/VINYL ACETATE/ACRYLIC ACID TERPOLYMER: GROUP III | | | | | |
| O | Direct stirred autoclave polymerization | .27 | 33 | 10.6 | 5.1 | 10,000 |
| P | do | 3.7 | 170 | 38.6 | 3.3 | 750 |
| | | | | Percent by Weight Co-monomer in Product | | |
| | POLYETHYLENE/MALEIC ANHYDRIDE GRAFT POLYMER: GROUP IV | | | | | |
| Q | Maleic anhydride graft polymerized onto 0.95 density, 0.2 melt index high pressure polyethylene. | .08 | .37 | 0.5 | | 65,500 |
| R | Maleic anhydride graft polymerized onto 0.92 density, 0.7 melt index high pressure polyethylene. | <.1 | .30 | 1.0 | | 22,900 |

*Table II.—Crosslinking agents for ethylene/acrylic acid [1] copolymers*

| Crosslinking Agent | Parts per Hundred parts Polymer | Uncrosslinked Polymer | | | Crosslinked Polymer Properties | | | | |
|---|---|---|---|---|---|---|---|---|---|
| | | Polyolefin [11] | Melt Index | Flow Index | Curing | | Percent Gel | Melt Index | Flow Index |
| | | | | | Temp., °C. | Time, min. | | | |
| Stannous octoate [2] | 14.0 | A | 4.0 | >200 | 180 | 30 | 24 | 1.6 | |
| Chromium octoate [3] | 24.6 | A | 4.0 | >200 | 180 | 30 | 58 | | 0.7 |
| Ferrous octoate [4] | 24.6 | A | 4.0 | >200 | 180 | 30 | 42 | .07 | |
| Zirconium octoate [5] | 10.0 | B | 0.25 | 31 | 120 | 15 | 52 | | 7.1 |
| Zinc octoate [6] | 8.8 | C | 9.4 | 580 | 180 | 30 | 11 | | 315 |
| Calcium octoate [7] | 20.0 | A | 4.0 | >200 | 220 | 30 | 23 | | |
| Zirconium salicylate [8] | 9.3 | A | 4.0 | >200 | 180 | 30 | 24 | 1.6 | |
| Zinc oxide | 16.0 | B | 0.25 | 31 | 170 | 10 | 85 | ([10]) | |
| Magnesium oxide | 5.0 | C | 9.4 | 580 | 180 | 30 | 34 | | 4.2 |
| Aluminum-acetyl acetonate | 10.0 | A | 4.0 | >200 | 180 | 15 | 23 | 1.2 | |
| Zirconium acetyl acetonate [9] | 14.6 | A | 4.0 | >200 | 180 | 30 | 37 | .03 | |

[1] Acrylic acid content determined either by KOH titration of free acid or by elemental oxygen analysis.
[2] 25.0% by weight tin.
[3] 6.4% by weight chromium.
[4] 6.6% by weight iron.
[5] 19.2% by weight zirconium.
[6] 22.0% by weight zinc.
[7] 5.0% by weight calcium.
[8] 20.6% by weight zirconium.
[9] 12.0% by weight zirconium.
[10] No extrusion (i.e., resin too viscous or stiff to extrude at the pressure and temperature of the test; values usually less than .001 or .01 gms./10 min.
[11] See Table I for description of polyolefin.

provide metal salt crosslinking which is characterized by reprocessability, freedom from the usual post-forming vulcanization, and reworkability of material. In Table II above, and in Tables III and IV following, the effect of the curing agent is noted by increase in percent gel and decrease in melt or flow index compared with the uncured control samples.

Example 2 and Example 3 following, illustrate in particular the effectiveness of oxides of metals of Groups IIA and IIB in reducing melt or flow index (increasing viscosity) and in increasing crosslinking (as measured by increased percent gel), especially when the oxide is used as a reactive filler, i.e., is used in large quantities, e.g., 10–150 parts per hundred part polymer.

In these and subsequent examples, the resin was fluxed on a two-roll mill at about 120° C. and the additives were then milled in. Milling time was approximately ten minutes, including ten end passes to disperse the additives. Compression molded plaques (20 or 75 mil thickness) were made and the plaque was cured in the mold at the designated temperature and time.

To determine percent gel, a 0.3 gram piece of the cured sheet was placed in a 100 mesh copper wire cage and immersed in refluxing ethyl benzene for 16 hours. The cage was then dried at 110° C. for 3 hours. The weight of the resin remaining in the cage was the gel.

EXAMPLE 3

Example 3 shows crosslinking of ethylene/ethyl acrylate/acrylic acid terpolymers and ethylene/vinyl acetate/acrylic acid terpolymers with crosslinking agents leading to reprocessable crosslinked polymeric compositions. Data for Example 3 is complied in Table III.

*Table III.—Crosslinking agents for terpolymers*

| Crosslinking Agent (Parts per Hundred Parts Polymer) [10] | Uncrosslinked Control | | | Cure Conditions | | Cured Data | |
|---|---|---|---|---|---|---|---|
| | Polymer Code | Percent COOH | Flow Index | Temp., °C. | Time, (min.) | Percent Gel | Flow Index |
| ETHYLENE/ETHYL ACRYLATE/ACRYLIC ACID TERPOLYMERS | | | | | | | |
| Zirconium octoate [1] (10.5) | G | 2.5 | 98 | 160 | 30 | 92 | N.E. |
| Zinc octoate [2] (12.2) | G | 2.5 | 98 | 180 | 30 | 0 | 3.8 |
| Zirconium naphthenate [3] (21.0) | G | 2.5 | 98 | 140 | 10 | 70 | .21 |
| Zinc oxide (5.0) | H | 2.6 | 425 | 180 | 30 | 64 | .34 |
| Magnesium oxide (5.0) | H | 2.6 | 425 | 180 | 30 | 95 | N.E. |
| Calcium oxide (11.2) | N | 2.2 | 82 | 180 | 60 | 91 | N.E. |
| Zinc acetyl acetonate (14.6) | G | 2.5 | 98 | 180 | 30 | 0 | 6.5 |
| Aluminum acetyl acetonate (12.0) | G | 2.5 | 98 | 180 | 30 | 59 | |
| Zirconium acetyl acetonate (28.0) | G | 2.5 | 98 | 180 | 30 | 71 | .046 |
| Chromium octoate [4] (12.2) | I | 1.30 | 156 | 180 | 30 | 66 | |
| Ferrous octoate [5] (12.2) | I | 1.30 | 156 | 180 | 30 | 58 | .35 |
| Zirconium salicylate [6] (6.8) | I | 1.30 | 156 | 180 | 30 | 23 | 68 |
| Stannous octoate (7.0) [7] | I | 1.30 | 156 | 180 | 30 | 59 | 10.9 |
| Nickel octoate (11.7) [8] | I | 1.30 | 156 | 180 | 30 | 47 | 30 |
| ETHYLENE/VINYL ACETATE/ACRYLIC ACID TERPOLYMERS | | | | | | | |
| Chromium octoate [9] (3.3) | O | 3.2 | 33 | 160 | 15 | 37 | 1.4 |
| Zinc oxide (100.0) | P | 2.1 | 170 | 150 | 20 | 0 | 20 |

[1] 19.2 percent by weight zirconium.
[2] 20.0 percent by weight zinc.
[3] 12.0 percent by weight zirconium.
[4] 6.4 percent by weight chromium.
[5] 6.6 percent by weight iron (II).
[6] 20.6 percent by weight zirconium.
[7] 25.0 percent by weight tin.
[8] 5.0 percent by weight nickel.
[9] 6.4 percent by weight chromium.
[10] The number in parentheses following the name of the crosslinking agent is the parts of crosslinking agent.

EXAMPLE 4

Example 4 shows crosslinking of polyethylene/maleic anhydride graft polymers with crosslinking agents leading to reprocessable crosslinked polymeric compositions. Data for Example 4 is compiled in Table IV.

*Table IV.—Crosslinking agents for polyethylene/maleic anhydride graft polymers*

| Crosslinking Agent (Parts per Hundred Parts Polymer) | Uncrosslinked Control | | | Cure Conditions | | Cured Data | |
|---|---|---|---|---|---|---|---|
| | Polymer Code | Percent Maleic Anhydride | Flow Index | Temp., °C. | Time (min.) | Percent Gel | Flow Index |
| Zinc oxide (20) | R | 1.0 | .30 | 180 | 30 | 75 | N.E. |
| Zirconium octoate (19.2% Zr) (8) | R | 1.0 | .30 | 180 | 30 | 82 | N.E. |
| Do | Q | 0.5 | 37 | 130 | 30 | 61 | .20 |

EXAMPLE 5

Example 5 shows the effect and range of concentration of crosslinking agent. Data for Example 5 is compiled in Table V.

Table V.—Effect of concentration of crosslinking agent

| Crosslinking Agent (Parts per Hundred Parts Polymer) | Initial Resin | | Curing | | Crosslinked Properties | |
|---|---|---|---|---|---|---|
| | Resin Code | Flow Index | Time, min. | Temp., °C. | Gel, Percent | Flow Index |
| Zirconium octoate [1] (0.5) | I | 156 | 180 | 30 | 8 | 80 |
| Zirconium octoate [1] (1.0) | I | 156 | 180 | 30 | 26 | 51 |
| Zirconium octoate [1] (2.0) | I | 156 | 180 | 30 | 41 | 2.6 |
| Zirconium octoate [1] (6.0) | I | 156 | 180 | 30 | 62 | 0.9 |
| Zirconium octoate [1] (20.0) | G | 98 | 180 | 30 | 65 | 2.1 |
| Zirconium octoate [1] (25.0) | D | 300 | 180 | 30 | 50 | 3.6 |
| Zinc oxide (50.0) | G | 98 | 180 | 30 | 0 | .01 |
| Chromium octoate [2] (0.78) | O | 33 | 160 | 15 | 2 | |
| Chromium octoate [2] (1.56) | O | 33 | 160 | 15 | | 3.0 |
| Chromium octoate [2] (3.1) | O | 33 | 160 | 15 | 37 | 1.4 |
| Zinc oxide (100.0) | P | 170 | 150 | 20 | 0 | 20 |
| Zinc oxide (100.0) | H | 425 | 150 | 20 | 60 | N.E. |

[1] 20 percent by weight zirconium.
[2] 6.4 percent by weight chromium.

EXAMPLE 6

Example 6 illustrates the effect and range of carboxyl content and comonomer concentrations, and melt indices of uncured polymers. Resins codes J, Q, F, and B illustrate polymers of varying carboxyl content, and polymers codes B, G, H, and P demonstrate crosslinkability of polymers containing up to about 40 percent by weight of a non-carboxyl group containing comonomer. Resins codes Q, E, J, and F show examples of varying melt indices of base polymers. Data for Example 6 is compiled in Table VI.

EXAMPLE 7

Example 7 illustrates that crosslinking of carboxyl and anhydride-containing copolymers effects improvement in stress crack resistance, elevated temperature (100° and 150° C.) tensile strength, and usually in tensile impact strength, tensile strength, elongation and yield strength at room temperature, and in chemical resistance at both 23° C. and elevated temperatures (for example, 140° C., the temperature of the gel or insolubility test). In Table VII is compiled physical property data on crosslinked hydrolyzed ethylene-ethyl acrylate copolymers and on an ethylene-acrylic acid copolymer (Code B), and on uncured controls of these polymers.

Table VI.—Effect of resin variables

| Resin Code | Percent Ethyl Acrylate or Vinyl Acetate | Percent COOH | Crosslinker | | Melt Index | Flow Index | Percent Gel |
|---|---|---|---|---|---|---|---|
| | | | Reagent | Php [1] | | | |
| J | 0 | 0.8 | | | 2.5 | | 0 |
| J | 0 | 0.8 | Zr. oct. | 10 | 0.33 | | 16 |
| Q | 0 | [2] 0.5 | | | .08 | 37 | |
| Q | 0 | [2] 0.5 | Zr. oct. | 8 | N.E. | .20 | 61 |
| F | 0 | 2.6 | | | 79 | | 0 |
| F | 0 | 2.6 | Zr. oct. | 10 | 16 | | 25 |
| B | 0 | 8.5 | | | .25 | 31 | 8 |
| B | 0 | | Zr. oct. | 10 | .1 | 7 | 52 |
| G | [3] 11 | 2.5 | | | | 98 | 0 |
| G | [3] 11 | 2.5 | Zr. oct. | 10 | N.E. | .06 | 65 |
| H | [3] 20 | 2.6 | | | 25 | 425 | 0 |
| H | [3] 20 | 2.6 | Zr. oct. | 9 | | .13 | 86 |
| P | [4] 38.6 | 2.1 | | | 3.7 | 170 | 0 |
| P | [4] 38.6 | 2.1 | Zr. oct. | 10 | 0.45 | 20 | 40 |
| E | 0 | 4.5 | | | .17 | 30 | |
| E | 0 | 4.5 | Zr. oct. | 10 | N.E. | N.E. | 43 |

[1] Parts per hundred parts polymer.
[2] Percent by weight maleic anhydride (by infrared).
[3] Ethyl Acrylate.
[4] Vinyl Acetate.

Table VII.—Physical properties of crosslinked ethylene/ethyl acrylate/acrylate acid [1] terpolymers

| Crosslinking Agent (Parts per Hundred Parts Polymer) | Resin Code | Percent Gel | Tensile Impact | Tensile Strength, p.s.i. | Elongation, percent | Yield Strength, p.s.i. | Strength at 100° C., p.s.i. | Secant Mod., p.s.i. | Flow Index |
|---|---|---|---|---|---|---|---|---|---|
| Control (0) | G | 0 | 550 | 2,300 | 650 | 685 | 0 | 5,740 | 98 |
| Zirconium octoate (10.5) | G | 65 | 603 | 2,190 | 365 | 1,610 | 170 | 5,380 | .06 |
| Control (0) | M | 0 | 260 | 440 | 210 | 440 | | 2,700 | 200 |
| Zirconium octoate (10) | M | 51 | 365 | 820 | 220 | 820 | | 2,630 | 20 |
| Control (0) | L | 0 | 702 | 3,420 | 575 | 3,420 | 46 | 14,440 | 52 |
| Zirconium octoate (15) | L | 60 | 580 | 2,280 | 460 | 1,895 | 390 | 11,450 | .07 |
| Zinc acetyl acetonate (13.6) | L | 18 | 354 | 2,900 | 375 | 1,510 | 280 | 24,040 | 2 |
| Control (0) | K | 0 | 880 | 3,300 | 565 | 960 | 270 | 12,730 | 45 |
| Zirconium octoate (16.6) | K | 80 | 640 | 2,660 | 465 | 1,250 | 440 | 12,160 | [2] N.E. |
| Control (0) | I | 0 | 387 | 1,760 | 450 | 1,210 | 110 | 16,200 | 156 |
| Zirconium octoate (10.5) | I | 60 | 460 | 1,660 | 550 | 1,030 | 540 | 12,900 | 6.6 |
| Control (0) | B | | 143 | 2,300 | 90 | 1,790 | 360 | 44,100 | 31 |
| Zinc oxide (16.0) | B | | 147 | 3,620 | 40 | 3,620 | 1,450 | 90,400 | N.E. |

[1] The curing reaction using zirconium octoate and zinc oxide is complete by pressing at 120° C. for 10 minutes; acetonates are complete at about 180° C.
[2] No extrusion.

EXAMPLE 8

Example 8 illustrates the variety of fillers which can be successively accepted by the reprocessable crosslinked systems of this invention. Data for Example 8 is compiled in Table VIII. Ethylene/ethyl acrylate/acrylic acid terpolymer was used as the carboxyl group-containing polyolefins in this example.

From Table VIII it can be seen that when the terpolymer is crosslinked with 20 parts per hundred of terpolymer, by weight, the flow index was decreased from 98 to 0.27. A control copolymer of ethylene and ethyl acrylate, on the other hand, when mixed with 33 parts zinc oxide per hundred parts of resin, remains virtually unchanged in melt index. This example illustrates the combined crosslinking/filling function served by metal oxides.

EXAMPLE 9

Example 9 illustrates the improvement in stress crack resistance gained by use of the reprocessable crosslinked systems of this invention. In Table IX is compiled data for this example.

*Table IX.—Improved stress crack resistance by crosslinking*

| Crosslinking Agent (Parts per Hundred Parts Polymer) | Number of Breaks per 20 Samples | $F_{50}$ |
|---|---|---|
| Zirconium octoate (10) | 1 | 3 wks. |
| Zinc oxide (20) | 0 | 3 wks. |
| Control, Polymer Code G (0) | 20 | 8 hrs. |

EXAMPLE 10

Example 10 illustrates the reprocessability of the reversibly cured polymers of this invention. The physical properties of the cured systems compression molded a second time are essentially as good as the physical properties of those cured systems compression molded only once. Comparable covalently crosslinked systems, for example, those cured with dianisidine diisocyanate, and polyolefins, for example polyethylene, cured with peroxides, cannot be remolded or extruded after cure to provide a polymeric system having good properties. The poor tensile properties, poor impact strength, and brittleness of the remolded covalently crosslinked systems are especially noteworthy in this connection.

In Table X is compiled data showing reprocessability of reversibly crosslinked ethylene/ethyl acrylate/acrylic acid terpolymer. In Table XI is presented similar data for reversibly crosslinked ethylene/ethyl acrylate copolymer, and in Table XII is compiled data for reversibly crosslinked polyethylene/maleic anhydride graft polymer.

*Table VIII.—Filled vulcanizates [1]*

| Filler and Crosslinking Agent (parts per hundred parts polymer) | Resin Code | Percent Gel | Tensile Impact | Tensile Str., p.s.i. | Elong., percent | Yield Strength, p.s.i. | Tensile Strength, 100° C. p.s.i. | Secant Modulus, p.s.i. | Flow Index | Brittle Temp., °C. |
|---|---|---|---|---|---|---|---|---|---|---|
| ETHYLENE/ETHYL ACRYLATE/ACRYLIC ACID TERPOLYMER | | | | | | | | | | |
| Control (0) | K | 0 | 880 | 3,300 | 565 | 960 | 270 | 26,980 | 45 | |
| (40) Clay plus (13) Zirconium octoate [2] | K | 75 | 360 | 2,280 | 325 | 1,440 | 590 | 24,580 | .03 | |
| Zinc oxide (15) | K | 94 | 140 | 2,940 | 140 | 2,290 | 455 | 26,580 | N.E. | |
| Control (0) | G | 0 | 550 | 2,300 | 650 | 685 | 0 | 5,740 | 98 | <−105 |
| Zinc oxide [2] (50) | G | 58 | 540 | 3,270 | 360 | 3,270 | 355 | 13,000 | <.01 | −102 |
| (40) Clay plus (10) Zirconium octoate | G | 71 | 405 | 1,750 | 400 | 1,190 | 120 | 10,780 | .016 | −62 |
| Zinc oxide (20) | G | 0 | 522 | 3,810 | 465 | 3,810 | 200 | 10,510 | .27 | −105 |
| Control (0) | H | 0 | 430 | 270 | 275 | 170 | 0 | ([3]) | 425 | |
| Zinc oxide (20) | H | 0 | 300 | 2,900 | 495 | 570 | 210 | 2,050 | 0.17 | <−105 |
| Zinc oxide (150) | H | 60 | | 2,800 | 550 | | | 5,700 | N.E. | |
| Control (0) | L | 0 | 700 | 3,420 | 575 | 3,420 | 50 | 14,440 | 52 | |
| (100) Carbon black plus (16) Zirconium octoate | L | 83 | 130 | 2,060 | 70 | 2,060 | 570 | 48,600 | .04 | |

[1] Compression molded at 180° C. for 30 minutes unless otherwise stated.
[2] Molded at 120° C., 15 minutes.
[3] Too soft.

*Table X.—Reprocessability of crosslinked ethylene/ethyl acrylate/acrylic acid terpolymer*

| Resin Code | Crosslinking Agent (Parts per hundred parts polymer) | No. of Pressings | Percent Gel | Tensile Prop., 23° C. | | | | Tensile Prop., 100° C. | | | Tensile Impact | Brittleness Temp., °C. | Modulus, p.s.i. |
|---|---|---|---|---|---|---|---|---|---|---|---|---|---|
| | | | | Flow Index | Strength, p.s.i. | Elongation, Percent | Yield, p.s.i. | Strength, p.s.i. | Elongation, Percent | Yield, Percent | | | |
| I | Zirconium octoate (20) | 1 | 87 | N.E. | 2,640 | 415 | 1,390 | 490 | 200 | 160 | 520 | | 12,600 |
| I | do | 2 | | .06 | 2,230 | 350 | 1,510 | 465 | 190 | 150 | 550 | | 14,200 |
| G | Zirconium octoate (10) | 1 | 65 | | 2,020 | 410 | 2,020 | 60 | 95 | 60 | 670 | −77 | 5,000 |
| G | do | 2 | 59 | | 1,780 | 335 | 1,780 | 0 | 0 | 0 | 590 | −77 | |
| G | do | 4 | 58 | | 1,300 | 210 | 1,300 | 50 | 140 | 50 | 430 | −70 | |
| G | Dianisidine diisocyanate [1] (7.8) | 2 | 83 | N.E. | 675 | 30 | 675 | 50 | 10 | 50 | 120 | ([2]) | |
| Polyethylene [2] | Dicumyl Peroxide (4) | 1 | 88 | N.E. | 2,380 | 395 | 2,380 | | | | 810 | | 10,700 |
| Do.[3] | do | 2 | 83 | N.E. | 1,380 | 155 | 1,380 | | | | 220 | | 11,100 |

[1] The first pressing would have properties similar to the zirconium octoate cured compound using same base resin.
[2] Poor.
[3] 0.918 density, 2 melt index, high pressure process Table XI.—*Reprocessability of polyvalent metal salt crosslinked ethylene/acrylic acid copolymers* [1]

| Processing | Percent Gel | Flow Index | Modulus | Tensile Prop., 23 °C. | | | Tensile Impact |
|---|---|---|---|---|---|---|---|
| | | | | Str. | Elong. | Yield | |
| Press-cured [2] one time | 43 | 10 | 40,400 | 2,050 | 140 | 1,690 | 138 |
| Repressed [3] | 45 | 7 | | 1,990 | 180 | 1,800 | 155 |
| Control | | 37 | 38,800 | 1,920 | 85 | 1,540 | 94 |

[1] Resin Code E.
[2] 10 parts zirconium octoate used per hundred parts polymer; cured 180° C. for 30 minutes.
[3] Press-cured plaque broken, pieces plied, then compression molded again at 180 ° C. for 15 minutes.

Table XII.—*Reprocessability of crosslinked polyethylene/ maleic anhydride graft polymer*

| Crosslinking Agent (Parts per hundred parts polymer) | Resin Code | Curing | | Tensile Prop. | | Percent Gel | Flow Index | Tensile Impact | Modulus |
|---|---|---|---|---|---|---|---|---|---|
| | | Temp., °C., | Time, min. | Strength, p.s.i. | Elongation, percent | | | | |
| Control (0) | R | 180 | 15 | 2,050 | 400 | 26 | .31 | 250 | 24,300 |
| Zinc oxide (20) | R | 180 | 30 | 1,730 | 200 | 75 | N.E. | 260 | 22,600 |
| Zirconium octoate (8) | R | 180 | 30 | 2,100 | 230 | 82 | N.E. | 330 | 13,700 |
| Zirconium octoate (repressed) (8) | R | 180 | 15 | 2,030 | 100 | 82 | N.E. | 370 | 16,400 |
| Control (0) | Q | 180 | 150 | 3,420 | 100 | | 37 | 57 | 65,500 |
| Zirconium octoate (8) | Q | 180 | 30 | 2,910 | 55 | 61 | .20 | 102 | 81,900 |
| Zirconium octoate (repressed)(8) | Q | 180 | 15 | 3,320 | 85 | 52 | 106 | 118 | 81,400 |

EXAMPLE 11

To demonstrate the reprocessability of the reversibly crosslinked polymers of this invention still further, metal salt-crosslinked polymers were, after having been press-cured, extruded through a batch extruder, having the barrel of the conventional melt indexer described in ASTM D–1238–57T, a melt index die, and having a motor driven ram operable up to about 15,000 p.s.i. An ethylene/ethyl acrylate/acrylic acid terpolymer (Code I) containing 15 parts nickel octoate (5% nickel), for example, was satisfactorily extruded at a pressure of about 2,000 p.s.i.

In Table XIII is presented data for four crosslinked of polymers of this invention, compared with a peroxide-cured control. All samples retained their original degree of crosslinking (percent gel) after the high stress-high temperature conditions were removed.

Table XIII.—*Extrusion of reprocessable crosslinked ethylene polymers*

| Resin Code | Crosslinking Agent (Parts per hundred parts polymer) | Extrusion Temp., °C. | Pressure, p.s.i. | Appearance of Extrudate |
|---|---|---|---|---|
| I | Nickel octoate (15) | 190 | 2,200 | Fair to Good. |
| L | Zinc oxide (40) | 180 | 2,000 | Good. |
| I | Zinc octoate (12) | 150 | 2,400 | Very Good. |
| G | Zinc acetyl acetonate (14) | 150 | 2,500 | Good. |
| Polyethylene [1] | Dicumyl peroxide (4) | 150 | 3,600 | Powder; not fused completely, non-usable. |

[1] 0.918 density, 2 melt index, high pressure process.

What is claimed is:
1. Reprocessable crosslinked polymeric composition comprising per 100 parts by weight of polyolefin-based polymer having a melt index of from about 0 to 1000 and containing in its backbone from about 0.1 to 15 percent by weight, calculated as free carboxyl group, of pendant acid group selected from the group consisting of carboxyl and anhydride, from about 0.05 to 150 parts by weight of crosslinking agent selected from the group consisting of polyvalent metal alkanoates containing from 3 to about 12 carbon atoms in the alkane chain, salicylates, naphthenates, and acetonates, said polyvalent metal being selected from the group consisting of metals of Groups IIA, IIB, IIIA, IVA, IVB, VIB, and VIII of the Deming Periodic Table.
2. Reprocessable polymeric composition claimed in claim 1 wherein the crosslinking agent is a polyvalent metal alkanoate containing from 3 to 12 carbon atoms in the alkane chain.
3. Reprocessable polymeric composition claimed in claim 1 wherein the crosslinking agent is a polyvalent metal salicylate.
4. Reprocessable polymeric composition claimed in claim 1 wherein the crosslinking agent is a polyvalent metal naphthenate.
5. Reprocessable polymeric composition claimed in claim 1 wherein the crosslinking agent is a polyvalent metal acetyl acetonate.
6. Reprocessable polymeric composition claimed in claim 1 wherein said polyolefin-based polymer containing in its backbone pendant acid groups is an ethylene/acrylic acid copolymer.
7. Reprocessable crosslinked polymeric composition claimed in claim 1 wherein said polyolefin-based polymer containing in its backbone pendant acid groups is an ethylene/ethyl acrylate/acrylic acid terpolymer.
8. Reprocessable crosslinked polymeric composition claimed in claim 1 wherein said polyolefin-based polymer containing in its backbone pendant acid groups is an ethylene/vinyl acetate/acrylic acid terpolymer.

References Cited by the Examiner
UNITED STATES PATENTS 2,649,439   8/1953   Brown.
2,849,426   8/1958   Miller.
3,178,389   4/1965   Hallenbeck _____ 260—41.5

MORRIS LIEBMAN, *Primary Examiner.*

J. S. WALDRON, *Assistant Examiner.*